United States Patent [19]
Keibel

[11] Patent Number: 6,004,495
[45] Date of Patent: Dec. 21, 1999

[54] METHOD OF PRODUCING AN ADSORBER FILTER BODY

[75] Inventor: Thorsten Keibel, Oberkotzau, Germany

[73] Assignee: Helsa-Werke Helmut Sandler GmbH & Co. KG, Gefrees, Germany

[21] Appl. No.: 09/142,019

[22] PCT Filed: Mar. 21, 1997

[86] PCT No.: PCT/DE97/00589

§ 371 Date: Aug. 31, 1998

§ 102(e) Date: Aug. 31, 1998

[87] PCT Pub. No.: WO97/36666

PCT Pub. Date: Oct. 9, 1997

[30] Foreign Application Priority Data

Mar. 29, 1996 [DE] Germany .......................... 196 12 592

[51] Int. Cl.[6] .................................................. B01D 39/14
[52] U.S. Cl. ........................... 264/122; 55/524; 264/123; 264/DIG. 48; 210/510.1
[58] Field of Search .................................. 264/109, 122, 264/123, 126, DIG. 48; 55/524, DIG. 5; 210/510.1

[56] References Cited

U.S. PATENT DOCUMENTS

| | | | |
|---|---|---|---|
| 4,061,807 | 12/1977 | Shaler | 428/71 |
| 4,665,050 | 5/1987 | Degen | 55/524 |
| 5,256,360 | 10/1993 | Li | 264/DIG. 48 |
| 5,510,063 | 4/1996 | Gadkaree | 264/DIG. 48 |
| 5,593,626 | 1/1997 | Yagashita | 264/122 |
| 5,665,148 | 9/1997 | Muhlfeld | 55/524 |
| 5,820,967 | 11/1998 | Gadkaree | 264/176.1 |

FOREIGN PATENT DOCUMENTS 4034798  5/1992  Germany .

*Primary Examiner*—Daniel Stemmer
*Attorney, Agent, or Firm*—Hoffmann & Baron, LLP

[57] ABSTRACT

In a method of producing a filter body which comprises adsorber particles fixedly connected together by an adhesive and which is formed with through passages, a base member having through holes is used, through the through holes in which are passed needles which close off the through holes. The needles project into a housing chamber which is defined by the base member and into which the adsorber particles are then introduced. The needles project with end portions out of the adsorber particle bed. The adsorber particles are consolidated by the adhesive to constitute the filter body. Thereafter the needles are withdrawn from the consolidated filter body to give a filter body with corresponding through passages.

12 Claims, 1 Drawing Sheet

METHOD OF PRODUCING AN ADSORBER FILTER BODY

FIELD OF THE INVENTION

The invention relates to a method of producing an adsorber filter body.

BACKGROUND OF THE INVENTION

Filter bodies comprising adsorber particles tightly connected to each other by an adhesive, with the filter bodies having through passages, have hitherto been produced for example by an extrusion process, as is described for example in EP 0 492 081 A1. For that purpose the adsorber particles must be mixed with a plasticising agent. That mode of manufacture requires an extrusion apparatus which is expensive to buy. For that reason an extrusion apparatus of that kind is not suitable for the production of relatively small numbers of filter bodies comprising adsorber particles and having through passages therein, because the purchase price of the apparatus would have an excessive influence on the price per item of the filter bodies.

DE 40 34 798 A1 discloses a method of producing an adsorption flat filter comprising an air-permeable carrier in web form, on which a melt adhesive is applied in uniformly distributed fashion, but only partially covering the surface of the carrier, whereupon adsorber particles are fixed to the adhesive. The melt adhesive used in that known method is a reactive polyurethane-based melt adhesive which cross-links under the effect of moisture in the air and/or moisture of the carrier. As cross-linking of the adhesive does not take place at elevated temperatures, it is possible to use temperature-sensitive materials both for the carrier and also for the adsorber particles.

SUMMARY OF THE INVENTION

An object of the present invention is to provide a method of producing an adsorber filter body with which adsorber filter bodies with through passages can be inexpensively produced in a simple fashion.

Another object of the invention is to provide a method of producing an adsorber filter body having passages therethrough, which can be carried into effect by simple apparatus structure which also affords versatility of operation for producing different forms of filter bodies.

According to the invention those and other objects are attained by a method of producing a filter body comprising adsorber particles tightly connected together by adhesive, with through passages, wherein a base member provided with through holes is used, through the through holes in which are passed needles which close off the through holes. The needles project into a housing space or chamber which is defined by the base member. The adsorber particles are then introduced into the housing chamber, with the needles projecting with end portions out of the adsorber particle bed. Then the adsorber particles are consolidated or fixed together by the adhesive to form the filter body, and thereafter the needles are withdrawn from the filter body.

The through holes in the base member are of an internal cross-section which is matched in a close-tolerance relationship to the cross-section of the needles. The said cross-sections can be of a round or polygonal configuration. Round cross-sections have the advantage of being simpler and less expensive to produce. The needles may also be of a configuration involving a variable cross-section along their longitudinal extent. It has been found advantageous for the needles to be coated on their surface for example with TEFLON or the like in order to avoid or at least reduce adhesion of adsorber particles or adhesive, in such a way that removal of the needles can be effected without problem.

A peripherally extending side wall can be arranged on the base member and projects upwardly from the base member to establish the housing chamber, that is to say the adsorber particle bed. That peripherally extending side wall can be integrally connected to the base member, but it is also possible for the peripherally extending side wall to form a member which is separate from the base member. In the first-mentioned case the base member and the peripherally extending side wall can form a container which is repeatedly employed for implementing the method according to the invention, but it is also possible for the peripherally extending side wall to be respectively used only once, that is to say, after the method according to the invention has been carried into effect, the side wall remains fixedly joined to the filter body and thus forms a peripheral casing for the adsorber filter body.

In order to construct the adsorber filter body which is produced in accordance with the invention with a housing portion not only at its peripheral surface but also at its two mutually remote end faces, it is also possible to provide for example a layer of a setting synthetic resin on the base member through which the needles pass, prior to introduction of the adsorber particles into the container, then subsequently thereto to introduce the adsorber particles into the container, and immediately thereafter to provide a second synthetic resin layer on the adsorber particle bed, with the needles extending through the two layers of synthetic resin and the adsorber particle bed. After setting of the synthetic resin layers the needles are pulled out of the filter body and out of the base member again so that the result is the finished adsorber filter body with through passages, which is provided with a housing on all sides.

So that the container which defines and establishes the adsorber particle bed can be filled with adsorber particles without any problem, a preferred feature of the invention provides that the needles are passed from the underside of the container through the through holes in the container base member.

To carry the method according to the invention into effect, it is possible in a preferred feature of the invention to use an apparatus in which the needles extend away from a needle plate, the distribution of the needles on the needle plate corresponding to the distribution of the through holes in the base member of the container. A needle plate of that kind is simple and inexpensive to provide and easy to handle because in that case the needles can remain at any time in the through holes in the base member.

The housing chamber can be filled with adsorber particles in accordance with the desired thickness of the filter body. This means that, if the housing chamber is of a particular predetermined dimension in respect of height above the base member, it is possible to afford any possible thickness for the filter body, with the maximum thickness of the filter body corresponding to the predetermined height of the housing chamber.

Adsorber particles in the form of powder and/or in the form of granules and/or in the form of spheres or balls can be used for carrying out the method according to the invention for producing an adsorber filter body. The size of the particles can preferably be up to about 1 mm. The adsorber particles may be for example activated carbon particles. Activated carbon particles in the form of powder or granules are available at comparatively low cost.

The adsorber particle bed is preferably rendered uniform on the side remote from the base member, to provide a flat filter body surface. That operation of rendering the adsorber particle bed uniform can be effected for example by a shaking or jolting procedure. Another possible way of rendering the adsorber particle bed uniform involves a procedure for example whereby a plate element corresponding to the base member having through holes, with identical through holes through which the needles are passed or into which the needles at least extend, is temporarily arranged on the adsorber particle bed and the adsorber particle bed is slightly compressed with that plate element in order to provide for correspondingly rendering the adsorber particle bed uniform.

In a preferred feature the adsorber particles can be wetted with the adhesive before they are introduced into the container. It is also possible for adhesive particles to be introduced into the container jointly with the adsorber particles, the adhesive particles melting at elevated temperature and linking the adsorber particles to each other to constitute the filter body. In that respect the adhesive is used in such a quantity that the adsorber properties of the adsorber particles are not markedly impaired by the adhesive.

Consolidation of the filter body in the container is preferably effected at elevated temperature in order to increase the reaction speed of the adhesive or adhesive system and thus correspondingly reduce the production times for making adsorber filter bodies according to the invention.

The method according to the invention is suitable not only for making adsorber filter bodies in small numbers or short production series, but also for the production of larger numbers if for example a carousel principle is used.

Further objects, features and advantages will be apparent from the following description of a diagrammatically illustrated embodiment of a method of producing an adsorber filter body, with an apparatus for carrying out the method according to the invention, and also an adsorber filter body produced with that apparatus.

DESCRIPTION OF THE PREFERRED EMBODIMENT

Figure 1:
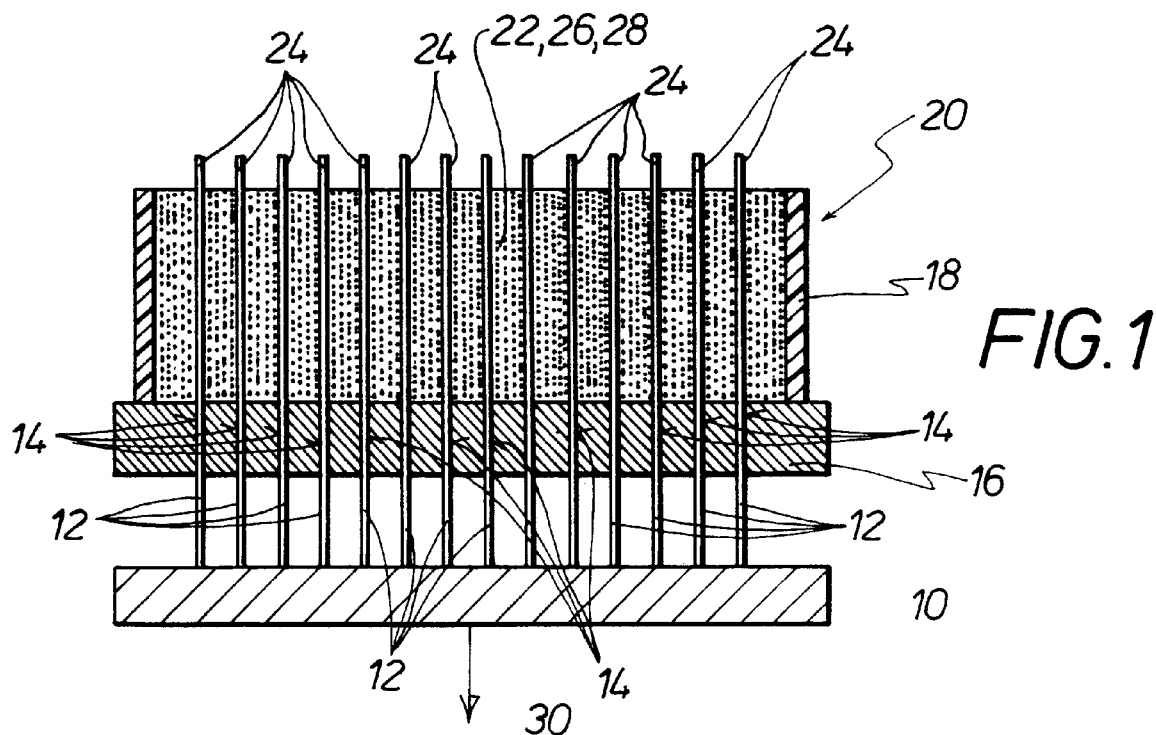
FIG. 1 is a sectional view of an apparatus for carrying out the method for producing an adsorber filter body in accordance with the invention.

Referring firstly to FIG. 1, shown therein is a needle plate 10 from which a plurality of spikes or needles 12 project upwardly. The needles 12 extend through through holes 14 provided in a base member 16. The through holes 14 are of an internal cross-section which is matched to the cross-section of the needles 12 in such a way that the needles 12 seal off the through holes 14.

Arranged on the base member 16 is a peripherally extending side wall 18. With the base member 16 the side wall 18 forms a container 20 which is open at the top side thereof and which is filled with adsorber particles 22 up to a given height to form a particle bed 26 therein. The needle plate 10 with the needles 12 is positioned in relation to the base member 16 or the container 20, in such a way that the needles 12 project upwardly out of the adsorber particle bed 26, with their end portions 24 that are remote from the needle plate 10. The adsorber particles 22 are wetted with an adhesive or the adsorber particles 22 are introduced into the container 20, jointly with adhesive particles. The adhesive serves to firmly link the adsorber particles together to constitute the filter body 28.

After that linking operation has been effected, that is to say after consolidation of the adsorber particles 22 to form the finished adsorber filter body 28 which is stable in respect of shape, the needle plate 10 with the needles 12 is retracted from the filter body 28 in the direction of the arrow 30, whereupon the filter body 28 is removed from the base member 16.

Figure 2:
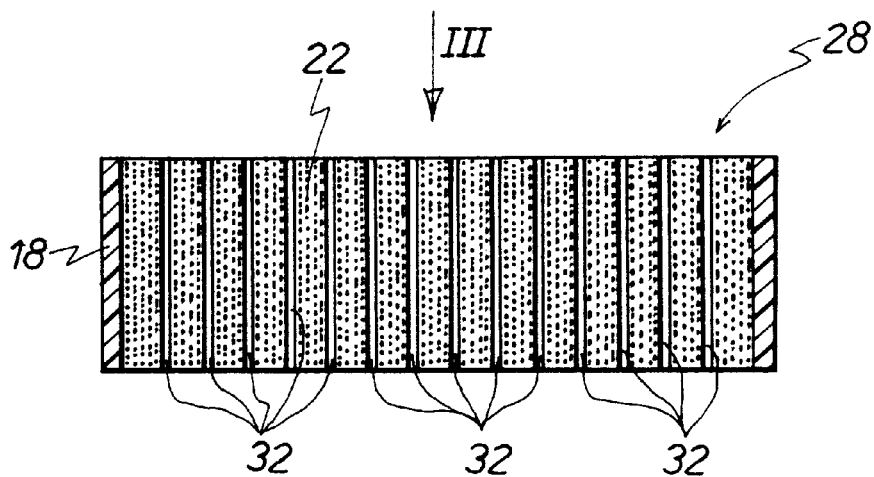
FIG. 2 is a sectional view of an adsorber filter body as is produced with the apparatus shown in FIG. 1.

FIG. 2 shows an adsorber filter body 28 produced in that way, with its through passages 32 which are disposed at spacings from each other and which extend in mutually parallel relationship. In the case of the adsorber filter body 28 shown in FIG. 2 the side wall 18 is a component of the filter body 28, that is to say it is fixedly connected thereto, and it forms a peripheral casing portion of the adsorber filter body 28. The side wall 18 can also be formed for example by a textile material which is glued to the filter body 28, but it can also be in the form of an integral component of the container 20, as shown in FIG. 1.

Figure 3:
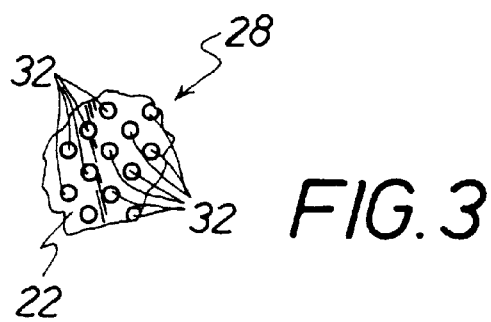
FIG. 3 shows a view of a part of the filter body illustrated in FIG. 2, viewing in the direction of the arrow III therein.

FIG. 3 shows a part of a front view of the adsorber filter body 28 with through passages 32 which are disposed at spacings from each other and which are uniformly distributed and which are of a round internal cross-section. The through passages 32 however may also be of a polygonal configuration. As needles 12 of round cross-section are the simplest to produce, filter bodies 28 with through passages 32 of a round internal cross-section can be relatively inexpensively produced.

It will be appreciated that the above-described method and apparatus structure in accordance with the invention have been set forth by way of example and illustration of the principles thereof and that various modifications and alterations can be made therein without thereby departing from the spirit and scope thereof.

What is claimed is:

1. A method of producing a filter body from adsorber particles tightly connected to each other by an adhesive, which has through passages comprising:

providing a base member having through holes;

passing through the through holes needles which close off the through holes and project into a housing chamber which is defined by the base member;

introducing adsorber particles into the housing chamber to form an adsorber particle bed therein, wherein the needles have end portions projecting out of the adsorber particle bed;

then consolidating the adsorber particles by the adhesive to form the filter body; and thereafter withdrawing the needles from the filter body.

2. A method as set forth in claim 1, wherein a container having a peripherally extending side wall which projects upwardly from the base member is used to establish the adsorber particle bed.

3. A method as set forth in claim 2, wherein the needles are passed from the underside of the container through the through holes in the base member.

4. A method as set forth in claim 1, wherein a device is used in which the needles project away from a needle plate, the distribution of the needles on the needle plate corresponding to the distribution of the through holes in the base member.

5. A method as set forth in claim 1, wherein the housing chamber is filled with adsorber particles in accordance with the desired thickness of the filter body.

6. A method as set forth in claim 1, wherein the adsorber particles are in powder form.

7. A method as set forth in claim 1, wherein the adsorber particles are in the form of granules.

8. A method as set forth in claim 1, wherein the adsorber particles are in the form of spheres.

9. A method as set forth in claim 1, wherein the adsorber particle bed is rendered uniform on the side remote from the base member to form a flat filter body surface.

10. A method as set forth in claim 2, wherein the adsorber particles are wetted with an adhesive before they are introduced into the container.

11. A method as set forth in claim 2, wherein adhesive particles are introduced into the container jointly with the adsorber particles, the adhesive particles melting at elevated temperature and linking the adsorber particles together to constitute the filter body.

12. A method as set forth in claim 1, wherein consolidation of the filter body is effected at elevated temperature.

* * * * *